US007277922B1

(12) United States Patent
Contractor (10) Patent No.: US 7,277,922 B1
(45) Date of Patent: Oct. 2, 2007

(54) COMPLETION OF INTERNET SESSION NOTIFICATION SERVICE

(75) Inventor: Sunil H. Contractor, Marietta, GA (US)

(73) Assignee: AT&T BLS Intellectual Property, Inc, Wilmington, DE (US)

( * ) Notice: Subject to any disclaimer, the term of this patent is extended or adjusted under 35 U.S.C. 154(b) by 1021 days.

(21) Appl. No.: 09/828,904

(22) Filed: Apr. 10, 2001

(51) Int. Cl.
*G06F 15/16* (2006.01)
*G06F 17/30* (2006.01)

(52) U.S. Cl. ........................................ 709/217; 705/10
(58) Field of Classification Search ................ 709/227, 709/228, 217, 219, 203; 379/201.01; 370/352–356, 370/259, 392; 705/42, 14, 43
See application file for complete search history.

(56) References Cited

U.S. PATENT DOCUMENTS

| 5,845,070 | A | * | 12/1998 | Ikudome ..................... 713/201 |
| 5,870,724 | A | * | 2/1999 | Lawlor et al. ................. 705/42 |
| 6,131,121 | A | * | 10/2000 | Mattaway et al. .......... 709/227 |
| 6,185,184 | B1 | * | 2/2001 | Mattaway et al. .......... 370/230 |
| 6,272,126 | B1 | * | 8/2001 | Strauss et al. .............. 370/352 |
| 6,438,599 | B1 | * | 8/2002 | Chack ......................... 709/229 |
| 6,606,644 | B1 | * | 8/2003 | Ford et al. ................... 709/203 |
| 6,714,931 | B1 | * | 3/2004 | Papierniak et al. ........... 707/10 |
| 2002/0007411 | A1 | * | 1/2002 | Shaked et al. ............... 709/229 |
| 2004/0236650 | A1 | * | 11/2004 | Zapiec et al. ................. 705/32 |

OTHER PUBLICATIONS

Hiawatha Bray, "Harried America Online Customers now face calls by telemarketers", Jul. 24, 1997, Boston Globe.*

* cited by examiner

*Primary Examiner*—Thomas K. Pham
(74) *Attorney, Agent, or Firm*—Withers & Keys, LLC (57) ABSTRACT

Method and apparatus are disclosed for contacting users based on the completion of an online session, such as an Internet session. A user begins an online session by logging into an access provider, such as an Internet Service Provider. Upon completion of the online session, the access provider can store online session data that describes the online session. The online session data may include such information as the identity of the user (e.g., a phone number, an address, and so forth) and the time the online session ended. This online session data can be processed by a caller in order to identify users to call. The caller may be the access provider or a third party, such as a telemarketer. The online session data may be processed in various manners. The online session data may be compared to data of failed calls to identify users who could not be contacted before, but that may now available based on the completion of their online sessions. The online session data may be processed to identify users having online sessions that were completed within some time interval. The online session data can be processed in other ways.

30 Claims, 11 Drawing Sheets

COMPLETION OF INTERNET SESSION NOTIFICATION SERVICE

FIELD OF THE INVENTION

The present invention relates to methods and apparatus for contacting residents at home, and more particularly, for contacting residents when they are not occupied on the Internet.

BACKGROUND OF THE INVENTION

Businesses often seek to contact residents at home by placing telephone calls. Credit card companies may contact existing account holders at home to solicit their interest in programs such as account insurance or balance transfers, or to solicit new card members. Video rental companies may contact residents at home regarding overdue movies. Polling companies may call large numbers of residents to conduct surveys and polls. Telemarketing companies may call large numbers of residents to solicit interest in various products and services.

However, the business making the phone calls often does not know whether the resident is home or not. The person making the call may get no answer or may get an answering machine. In most cases, the goal is a live conversation with a person, not to leave a message on an answering machine. The time and money spent on the unsuccessful phone call may be wasted. This is a significant problem.

Sometimes businesses make these calls in the evening around dinnertime. The hope is that the resident will be home at around this time. Unfortunately, many residents refuse to answer the phone during this period. This is also a significant problem.

Sometimes the resident is home but is occupied by an Internet session. Typically, the resident will not answer an incoming call during this period. If the resident has standard dial-in access to the Internet, the business will likely receive a busy signal. The resident does not answer because the line is occupied. Some residents may have multiple lines or an ISDN or ASDL connection that effectively gives them multiple lines. Such a resident may know that a call is incoming. However, the resident may not answer the incoming call because he/she is occupied by the Internet session.

The tendency of residents not to answer incoming calls during their Internet sessions is a significant obstacle for businesses attempting to contact these residents. The proliferation of home computers and Internet usage during recent years makes this an increasingly significant problem for these businesses.

It is also unlikely that a business knows that an unsuccessfully-contacted resident was at home, but was occupied with the Internet. Thus, the business does not know that a follow-up call later that day may be successful. Even if it is somehow known that a follow-up call is in order, the business does not know when to make the call. These are all significant problems.

SUMMARY OF THE INVENTION

Accordingly, the present invention is generally directed to a service for detecting the completion of an online session that substantially obviates one or more of the problems due to the limitations and disadvantages of the prior art.

Generally, a user begins an online session by logging into an access provider, such as an Internet Service Provider. Upon completion of the online session, the access provider can store online session data that describes the online session. The online session data may include such information as the identity of the user (e.g., a phone number, an address, and so forth) and the time the online session ended. This online session data can be processed by a caller in order to identify users to call. The caller may be the access provider or a third party, such as a telemarketer. The online session data may be processed in various manners. The online session data may be compared to data of failed calls to identify users who could not be contacted before, but that may now available based on the completion of their online sessions. The online session data may be processed to identify users having online sessions that were completed within some time interval. The online session data can be processed in other ways.

The advantages of the present invention are numerous. In particular, a caller can learn that a user is at home because an online session was just completed. The caller also knows an optimal time to call the user, for example, as a few minutes after the online session was completed. The caller can also use the information provided by the service to determine which users should be called back following an unsuccessful call. Other advantages and benefits exist.

DETAILED DESCRIPTION OF THE INVENTION

Figure 1:
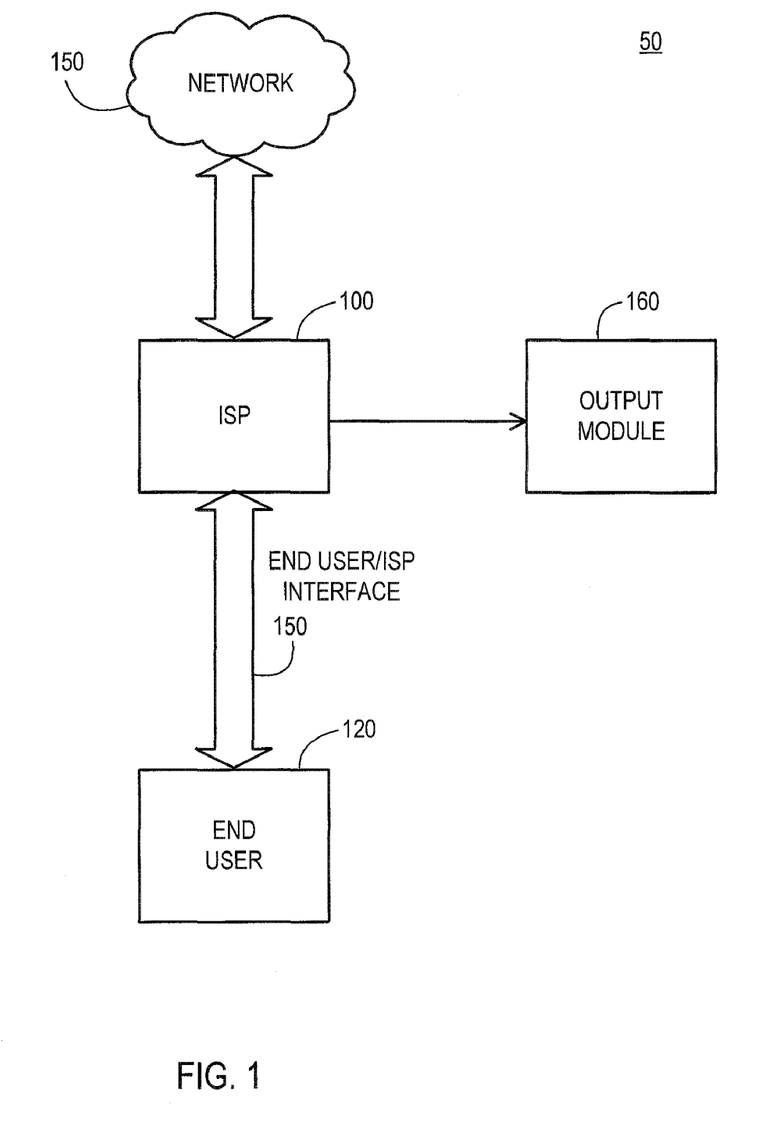
FIG. 1 is a schematic block diagram of a system for identifying users to be called according to an embodiment of the invention.

FIG. 1 is a schematic block diagram of an exemplary system 50 for identifying users to be called according to an embodiment of the invention. System 50 includes end user 120, end user/ISP interface 140, ISP 100, network 150, and output module 160. End user 120 interfaces with ISP 100 over end user/ISP interface 140. End user 120 comprises a device capable of transmitting and receiving data over a shared network. End user 120 may be a microcomputer, minicomputer, personal data assistant, cellular phone, two-way pager, and so forth. Preferably, end user 120 is a personal computer, such as a desktop personal computer or a laptop computer.

End user/ISP interface 140 is the interface that allows end user 120 to access ISP 100. End user/ISP interface 140 could be, for example, dial-up access using POTS (Plain Old Telephone Service) or ISDN (Integrated Services Digital Network). End user/ISP interface 140 could be any other existing or future technology for connecting a remote computer to an ISP server.

End user/ISP 140 interface allows end user 120 to access network 150 via ISP (Internet Service Provider) 100. ISP 100 is a server-based system for permitting multiple users to access network 150. Network 150 is a shared or distributed network through which multiple clients and servers can communicate. Network 150 could be the Internet2, IPng (Internet Protocol Next Generation), Local Area Network (LAN), Wide Area Network (WAN), or any other shared packet-switched network or conglomeration of networks through which multiple clients and servers can communicate. Preferably, network 150 is the Internet.

Output module 160 outputs information or data recorded by ISP 100 in accordance with the present invention. Output module 160 may be an e-mail, printer, facsimile, Web page, ftp file, direct serial connection, or other means by which ISP 100 can output saved information. Preferably, output module 160 comprises a Web page or e-mail to be sent by ISP 100.

The operation of system 50 is generally as follows. End users 120 (also referred to as "users") connect to shared network 150 through ISP 100. ISP 100 makes a network connection available by allocating certain lines or ports to end user 120. When end user 120 connects to network 150, an online session begins. When end user 120 decides to end the online session (e.g., log off network 150), the online session is complete. Upon completion of the online session, the user may use his/her computer offline or the user may turn the computer off altogether.

During the online session, ISP 100 may have access to data that can be used to describe an online session. For example, ISP 100 may require a user name and/or password for the end user 120 to commence the online session. ISP 100 may have a database that includes the user name, password, and associated information, such as the user's name, address, and so forth. ISP 100 can also determine the timing of the online session, such as the start of the online session (e.g., when a line or port is first allocated to the user) and the end of the online session (e.g., when the user logs out or otherwise disconnects). ISP 100 may subscribe to certain telephone services that can provide other data descriptive of an online session, such as the well-known "caller ID" or "call details." Call details provides ISP 100 with information about a call, such as calling number, caller name (name of the phone account holder), time of the call, duration of the call, and so forth.

Using information such as that described above or other information, ISP 100 can store output data or output records, referred to herein as "online session data." Online session data may be used by a caller to contact an end user 120 that has just completed an online session. The caller can be ISP 100 or its affiliate; preferably, the caller is a third party.

The online session data can include various types of data. It could include a calling number, name, duration of an online session, and end of the online session. Preferably, online session data includes sufficient information to identify an end user 120 that has just completed an online session. Accordingly, a name and/or a phone number and/or an address can be sufficient. Any other information permitting identification of a user that has completed an online session is sufficient.

In a preferred embodiment, the online session data includes information sufficient to indicate when the online session ended. Accordingly, the time of the end of the online session can be sufficient. The time of the start of the online session and the duration of the online session can be sufficient. Any other timing data from which the end of the online session can be derived is sufficient.

Figure 2:
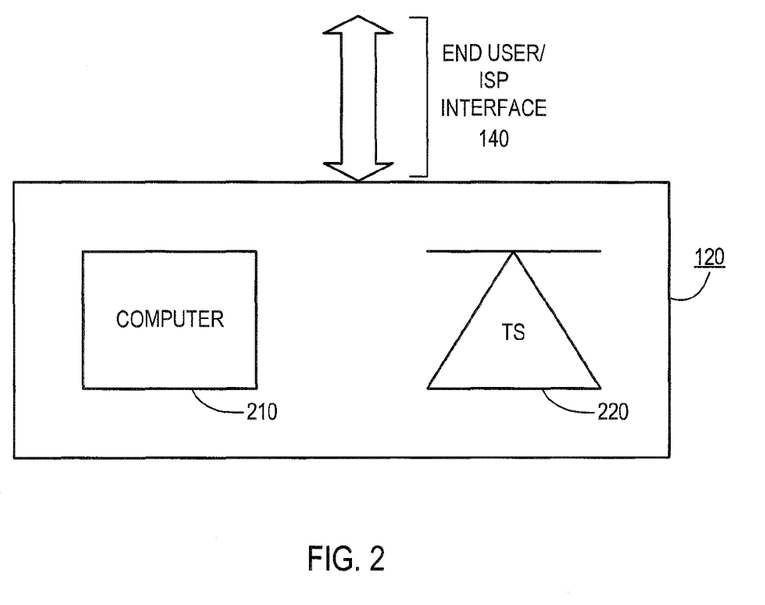
FIG. 2 is a schematic block diagram of an exemplary user and exemplary user interface according to an embodiment of the invention.

FIG. 2 is a schematic block diagram of an exemplary end user 120 and exemplary end user/ISP interface 140 according to an embodiment of the invention. In this embodiment, end user 210 includes a telephone 120 and a computer 210. Computer 210 may include any of the devices previously described for FIG. 1. Computer 210 and telephone 220 can be connected or not connected. Telephone 220 can be conventional touch-tone connected or not connected to computer 210. Telephone 220 can be a rotary telephone not connected to computer 210. Telephone 220 can be a telephone implemented on computer 210 through software. The MegaPhone™ software package sold by Cypress Research Corporation could be used.

Figure 3:
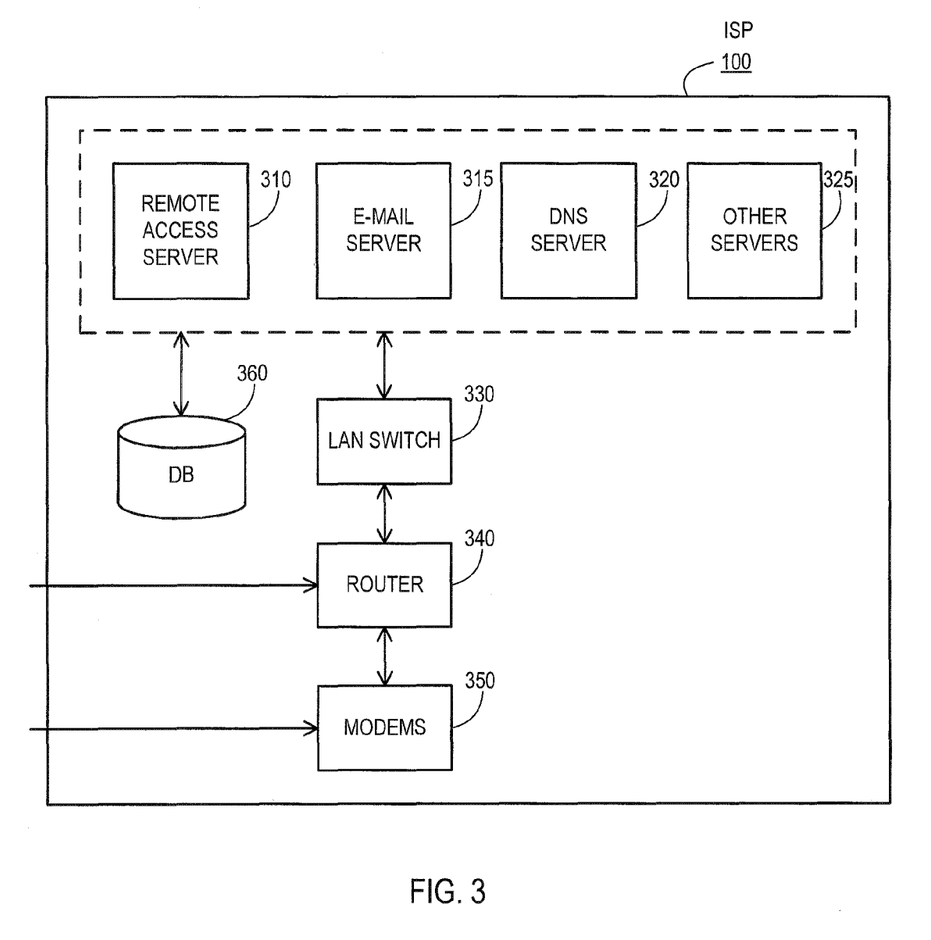
FIG. 3 is a schematic block diagram of an exemplary Internet Service Provider (ISP) according to an embodiment of the invention.

FIG. 3 is a schematic block diagram of an exemplary Internet Service Provider (ISP) 100 according to an embodiment of the invention. The exemplary ISP 100 includes servers 300, database 360, LAN switch 330, router 340, and modems 350.

Servers 300 provider the server function of ISP 100 in the client-server architecture generally observed on packet-switched networks. Servers 300 may include a remote access server 310, e-mail server 315, DNS server 320, and other servers 325. Remote access server 310 manages lines or ports allocated to end users 120 (FIG. 1) engaging in an online session. Remote access server 310 may set up, monitor, and take down such lines or ports as necessary. E-mail server 315 manages e-mail accounts held by end users 120. E-mail server 315 could be a SMTP server, well-known in the art. DNS server 320 is responsible for converting user-submitted addresses (e.g., Web addresses or URLs), to network virtual locations (e.g., IP or Internet Protocol addresses). DNS servers are well known in the art. Other servers 325 may be included as needed for ISP 100 to perform its various server functions.

LAN switch 330 is a local area network switch that provides switching for the various servers 300 of ISP 100. Router 340 provides routing of end users 120 to network 150 (FIG. 1). For example, if network 150 is the Internet, router 340 could route end users 120 to an Internet backbone. Modems 350 are modems that may be used for communication between ISP 100 and end users 120. Modems 350 may be a bank of modems for accommodating a large number of end users 120 (FIG. 1). Modems 350 may include conventional analog modems and specialized digital modems.

Figure 4:
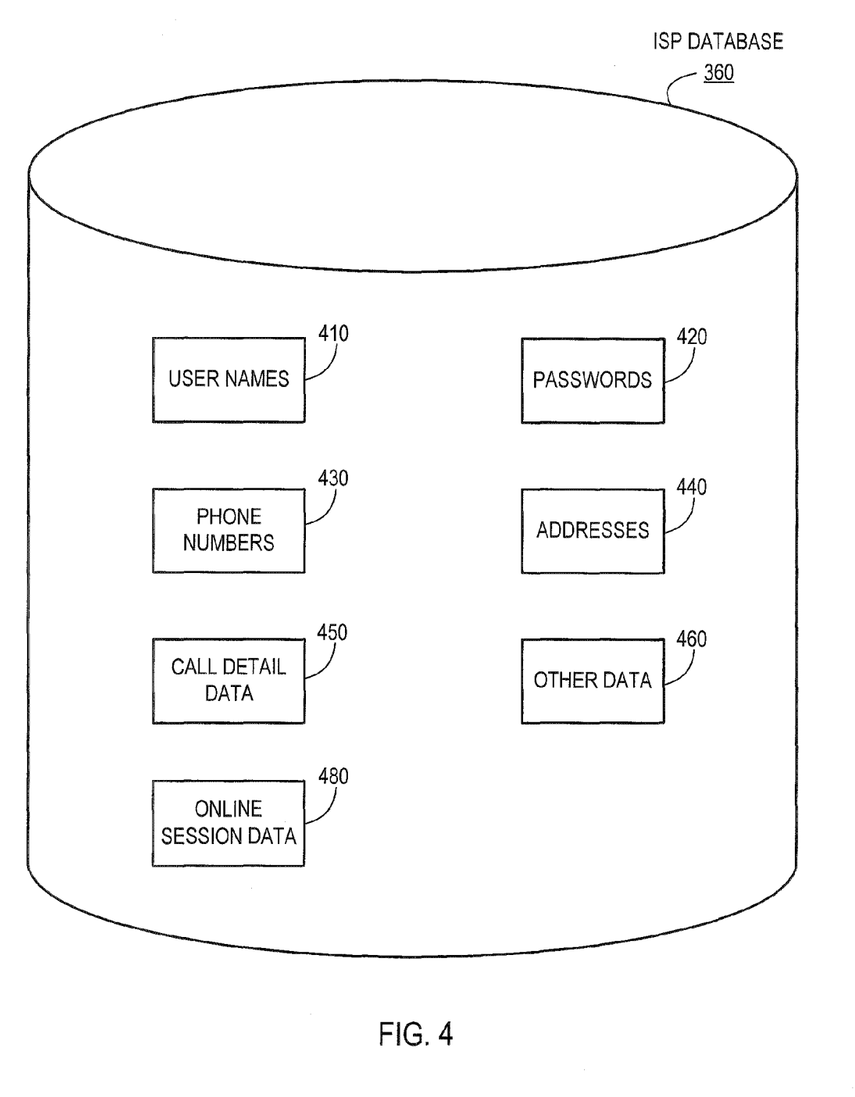
FIG. 4 is a schematic block diagram of an exemplary ISP database according to an embodiment of the invention.

Database 360 is a database employed by ISP 100. FIG. 4 is a block diagram of an exemplary database 360 according to an embodiment of the invention. The exemplary database 360 includes user names 410, passwords 420, phone numbers 430, addresses 440, call details data 450, online session data 480, and other data 460.

User names 410 and passwords 420 are used by ISP 100 for authentication of end users 120 logging in or connecting to network 150 (FIG. 1). Phone numbers 430 may be phone numbers of end users 120 that are subscribers to ISP 100. Addresses 440 may be addresses, such as residential addresses, of subscribers to ISP 100. Other data 460 may be other data stored by ISP 100, such as account balance data, payment last received, and similar data.

Call details data 450 may be call details data stored by ISP 100 for online sessions engaged in by end users 120. Call details data 450 may include information such as that described previously. Call details data 450 may comprise other information describing phone calls initiated by an end user 120 for purposes of an online session. Online session data 480 may comprises data or records stored by ISP 100 that describe an online session of an end user 120. These data or records can include information such as that described above for FIG. 1.

Figure 5:
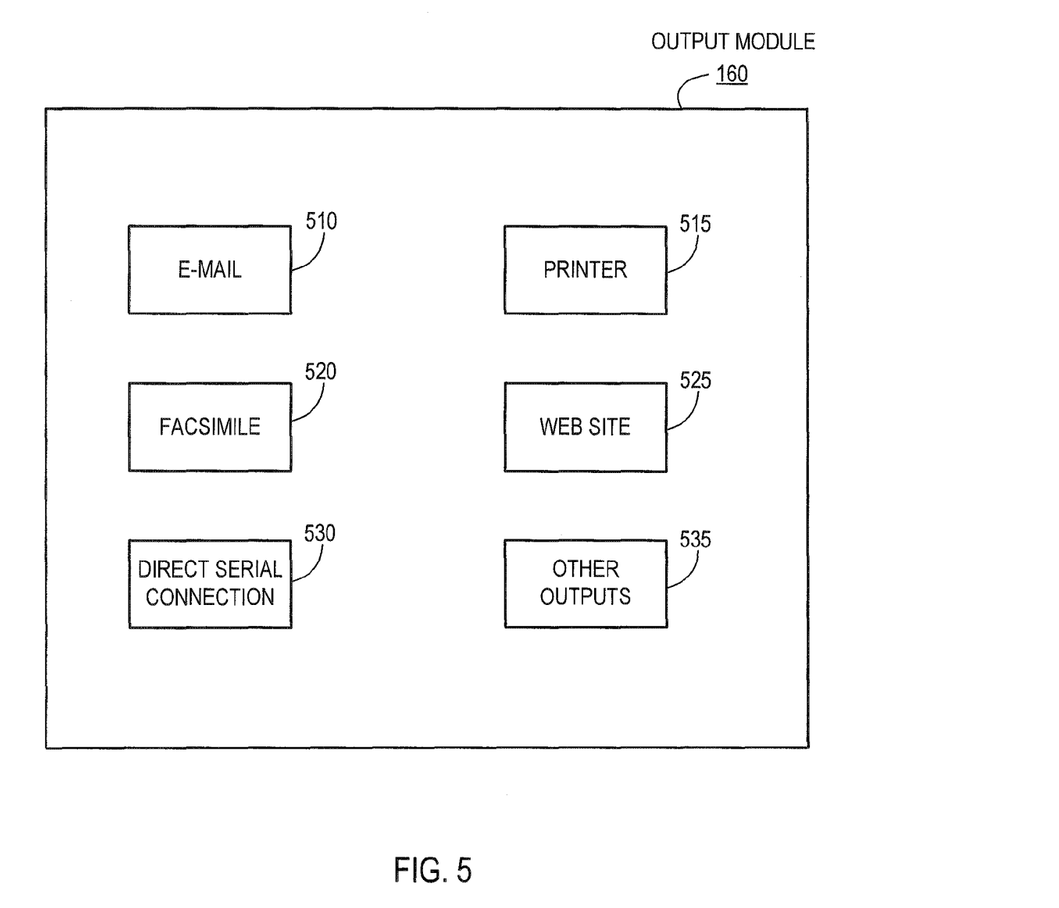
FIG. 5 is a schematic block diagram of an exemplary output module of an ISP according to an embodiment of the invention.

FIG. 5 is a schematic block diagram of an exemplary output module 160 of an ISP 100 according to an embodiment of the invention. Output module 160 may comprise any means for transmitting or sending online session data to another party, such as a caller. Output module 160 may include any of the following: e-mail 510; printer 515; facsimile 520; Web site 525; direct serial connection 530; and other outputs 535. Other outputs 535 might comprise a file transmitted to a caller via the well-known ftp protocol over the Internet. Preferably, output module 160 comprises an e-mail that can be sent to a caller or a Web site that can be accessed by a caller.

Several flowcharts illustrating exemplary methods for carrying out the invention are now described. In order to clearly illustrate operation of a method, reference may be made to system components from FIGS. 1-5. These references should be considered illustrative and exemplary only; a method should not be construed to be limited to being carried out by the referenced structure.

Figure 6:
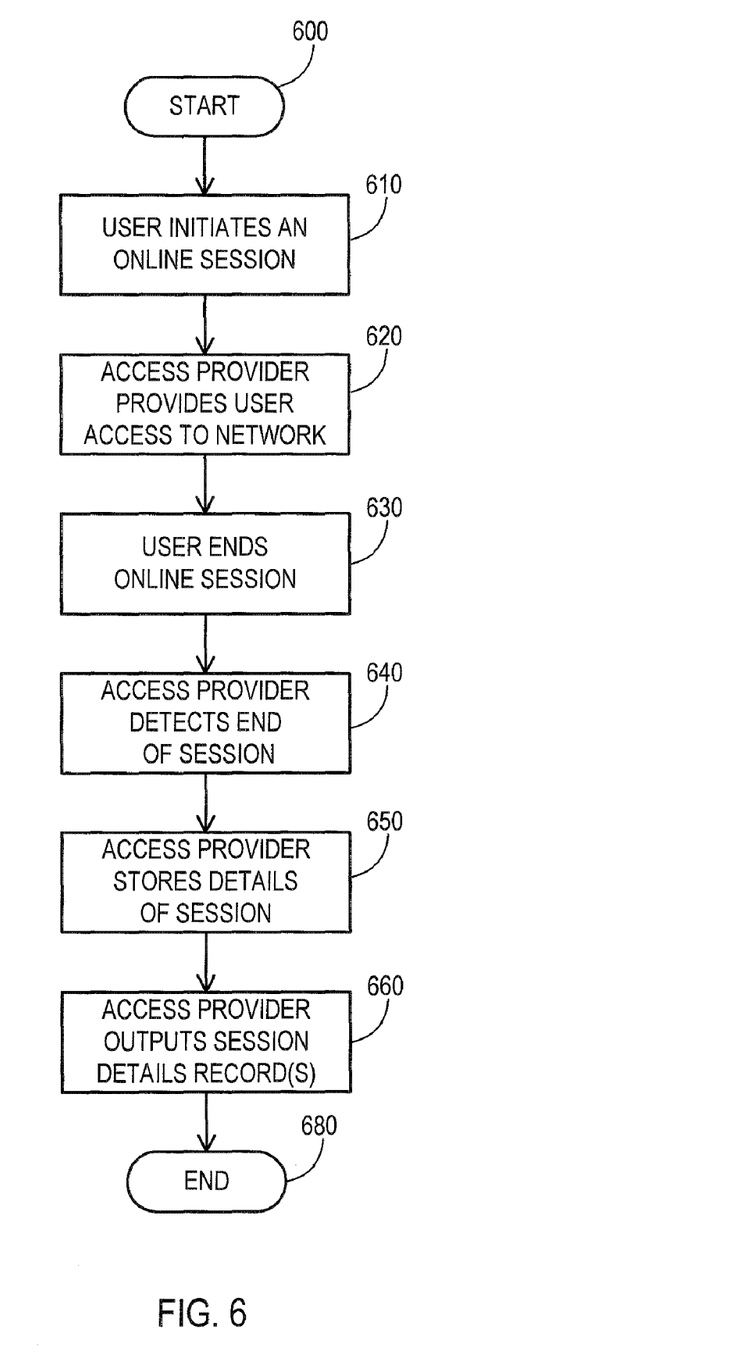
FIG. 6 is an exemplary flow diagram for identifying users to be called according to an embodiment of the invention.

FIG. 6 is an exemplary flow diagram identifying users to be called according to an embodiment of the invention. The method begins at 600. At 610, a user (e.g., end user 120 of FIG. 1) initiates an online session. At 620, an access provider (e.g., ISP 100 of FIG. 1) provides the user access to a network (e.g., the Internet). At 630, the user ends the online session.

At 640, the access provider detects the end of the online session. For example, the access provider can detect the end of the online session when a user logs out, when the user disconnects a call, or when a port or line is no longer allocated to the user. The access provider may detect or determine or identify the end of the online session in other ways.

At 650, the access provider stores details of the session. These details may include the online session data previously described. These details could be stored as online session data 480 in database 360. Preferably, the details include information sufficient to allow the access provider or a third party caller to identify the user so that the user can be called. Preferably, the details include information sufficient to allow the access provider or a third party caller to determine how long ago the user's online session was completed.

At 660, the access provider outputs session details records. The session details records may be outputted by output module 160. According to one embodiment, step 660 for outputting session details records may comprise transmitting the record to a caller. Preferably, the transmission is performed a substantially real time fashion relative to the step of storing 650. Alternatively, the transmission may be made within some time period relative to the detection of the end of the online session 640, such as within one minute, five minutes, ten minutes, fifteen minutes, and so forth. The method is complete at 680.

Figure 7A:
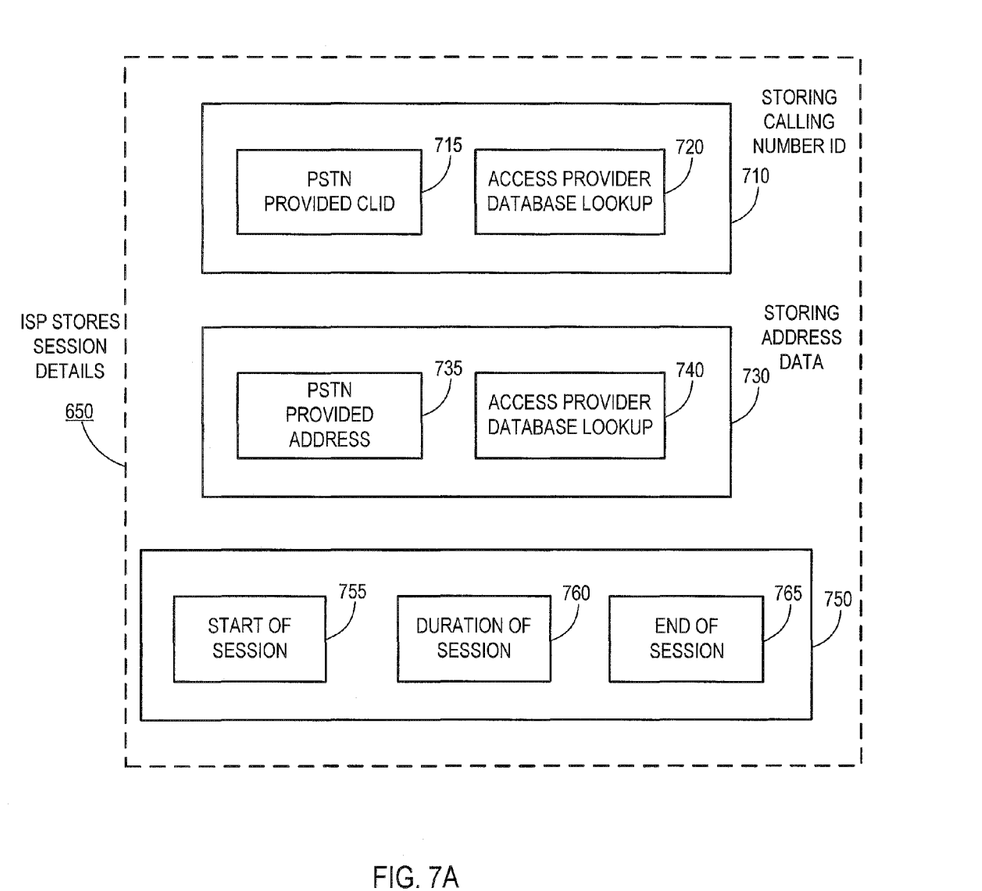
FIG. 7A is an exemplary flow diagram for storing online session details according to an embodiment of the invention.

Step 650 for storing details of the online session could include several types of data. FIG. 7A is an exemplary flow diagram for an exemplary step of storing session details according to an embodiment of the invention. Storing session details 650 could include storing calling number ID 710 (i.e., a phone number), storing address data 730, and storing time data 750.

Storing calling number ID 710 may comprise storing a calling number ID provided by the PSTN (Public Switched Telephone Network) 715. For example, Common Channel Interoffice Signaling (CCIS) telephone systems, such as Signaling System #7 ("SS7"), can readily provide such information (e.g., through such services as caller ID or call details). Storing calling number ID 710 could comprise the access provider looking up a caller number ID from a database 720, such as database 360 (FIG. 3). For example, using the user name and/or password, the access provider can look up the user's phone number.

Storing address data 730 may comprise storing a PSTN-provided address 735 or the access provider looking up an address from a database 740. A PSTN-provided address may be provided in connection with an enhanced call details service or other service providing an address. The access provider may look up an address from a database, such as database 360 (FIG. 3). For example, using the user name and/or password, the access provider can look up the user's address.

Storing time data 750 may comprise storing a start of session 755, a duration of session 760, and/or an end of session 765. These times or time durations can be ascertained as previously described.

Figure 7B:
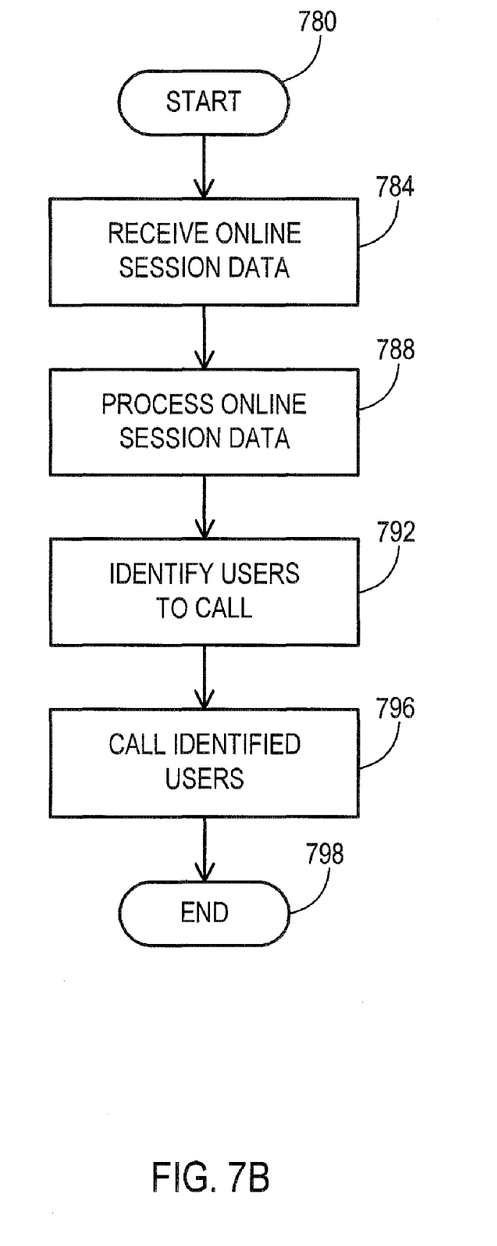
FIG. 7B is an exemplary flow diagram for identifying users to call according to an embodiment of the invention.

FIG. 7B is an exemplary flow diagram for identifying users to call according to an embodiment of the invention. The method begins at 780. At 784, online session data is received. The online session data could be transmitted or sent from an output module 160 (FIG. 1). At 788, the online session data is processed. For example, a caller might process the online session data to identify users that ended an online session within some time period, such as within the last hour or last half an hour. In addition, or alternatively, a caller might process the online session data to identify users that were previously unsuccessfully contacted ("failed calls"). Based on the processing, users to call are identified at 792. At 796, users identified in step 792 are called. The method is complete at 798.

Figure 8:
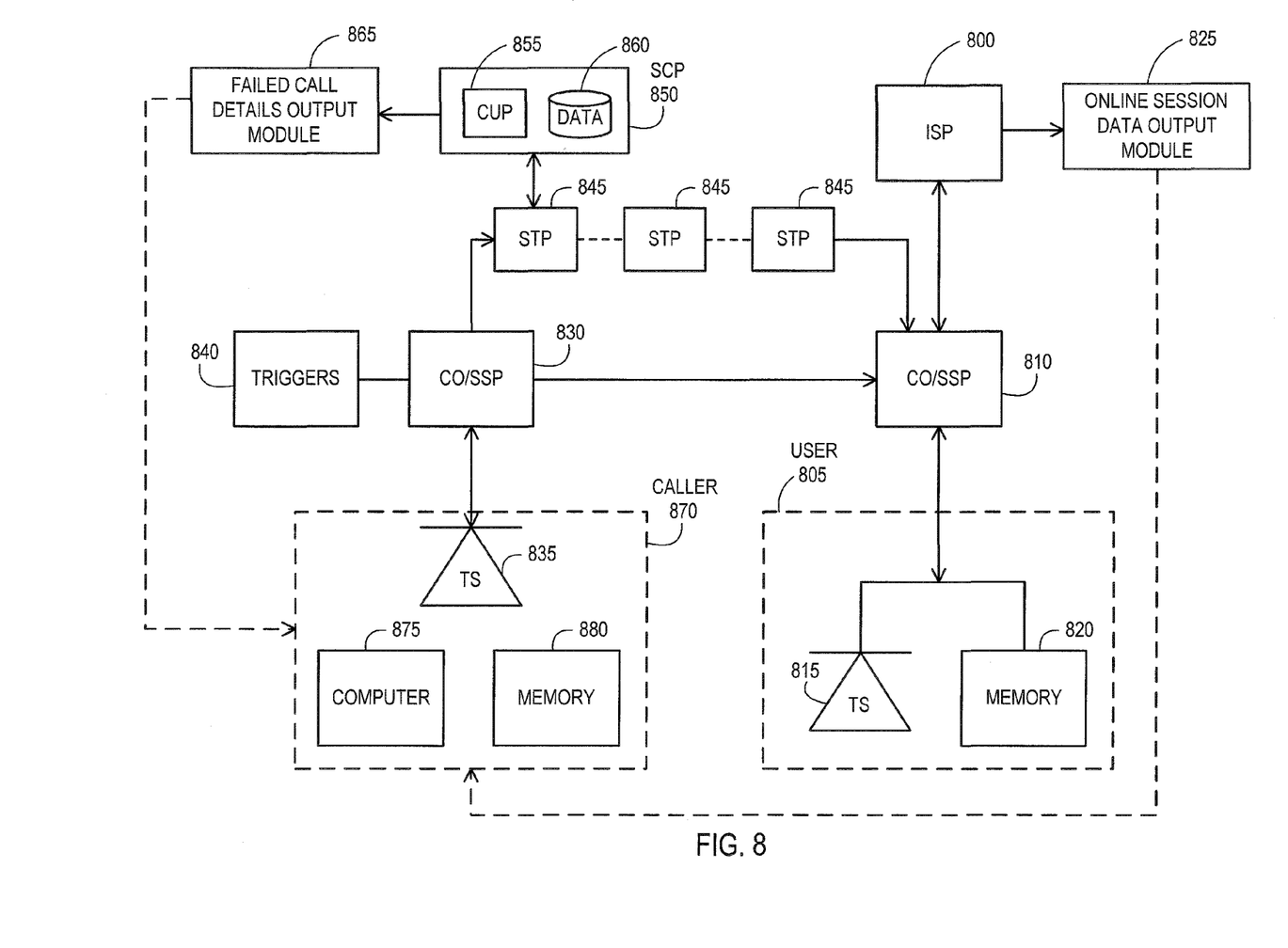
FIG. 8 is a schematic block diagram of an exemplary system for identifying users to be called according to an embodiment of the invention.

FIG. 8 is a schematic block diagram of an exemplary system 75 for identifying users to be called according to an embodiment of the invention. System 75 includes caller 870, user 805, central office/service switching point (CO/SSP) 830, triggers 840, CO/SSP 810, signal transfer points (STP) 845, ISP 800, online session data output module 825, service control point 850, and failed call details output module 865.

In the embodiment of FIG. 8, the completion of an online session notification service operates in the context of a Common Channel Interoffice Signaling (CCIS) telephone system, preferably a Signaling System #7 (SS7) system. The system provides signaling that is carried in an out-of-bank channel on a separate trunk. For example, a CCIS/SS7 type system enables a variety of Custom Local Area Signaling Service (CLASS) services to be provided. CLASS services include caller ID and call details, previously discussed. CCIS, SS7 and CLASS services are well known.

Caller 870 is a caller wishing to contact users. Caller 870 is generally a third party, although caller 870 could be part of ISP 800. Caller 870 may include telephone 835, computer 875, and memory 880. Telephone 835 and computer 875 may be configured and may include the devices discussed for end user 120 of FIG. 2. Telephone 835 may comprise automated dialing software for automatically dialing phone numbers. Telephone 835 is used to contact user 805. Computer 875 may be used for processing online session data, such as the processing step 788 of FIG. 7B. Memory 880 can store information, such as a list of calls to make or a list of failed calls.

User 805 is a user that may be conducting an online session. User 805 may include telephone 815 and computer 820, as previously discussed for end user 120 of FIG. 2. User 805 may contact ISP 800 through CO/SSP 810. User 805 may be contacted by caller 870 through CO/SSP 810.

CO/SSP 830 and CO/SSP 810 are switching offices that perform call routing services at the caller end and user end, respectively. CO/SSP 830 may include or be coupled to triggers 840. Triggers 840 trigger upon certain events or certain states. According to one embodiment, triggers 840 include a trigger for detecting a busy call (a so-called "O_Busy trigger") and/or a trigger for detecting an unanswered call (a so-called "O_No_Answer trigger").

STPs 845 are signal transfer points that route (e.g., receive, modify and forward) SS7 signals that are ultimately received by the CO/SSP 810. STPs 845 are well known in the art.

SCP 850 is a service control point (sometimes called a "signal control point") that supplies information used to route calls. SCP 850 may include processor 855 (which could be a computer, processor or microprocessor) and database 860 with customer-specific information for routing calls and for providing CLASS services. SCP 850 is well known in the art.

Failed call details output module 865 is a module for storing information of failed calls. In the preferred embodiment, failed call details output module 865 provides call details for calls attempted by caller 870 that resulted in a failed call. For example, if triggers 840 detected a busy call, the call details for that failed call may be stored. If trigger 840 detected an unanswered call, the call details for that failed call may be stored. The failed call details may be forwarded to caller 870 (e.g., to be stored in memory 880). In an alternative embodiment, failed call details may be collected and maintained by caller 870 so that failed call details output module 865 may be obviated.

ISP 800 is an online access provider as previously described for FIG. 1. Preferably, ISP 800 provides access to the Internet. ISP 800 is coupled to online session data output module 825 for outputting online session data to caller 870. The online session data could be stored in memory 880 of caller 870.

System 75 may operate as follows. Caller 870 attempts to contact users 805 through CO/SSP 830 and CO/SSP 810. If the attempt results in a failed call (busy or no answer), triggers 840 detect the busy call or unanswered call. SCP 850 retrieves call details information, such as the dialed number and/or address and/or location, associated with the failed call. The call details information is forwarded so that caller 870 has a record of the failed call. In an alternative embodiment, triggers 840 and failed call details output module 865 are not present. In this alternative embodiment, caller 870 maintains its own records of failed call information.

If there is a failed call, it may be because user 805 is conducting an online session through ISP 800. ISP 800 will forward online session data through online session data output module 825 after the user completes the session. The online session data may be forwarded to caller 870. Caller 870 can process the received data to determine which users to call.

Figure 9:
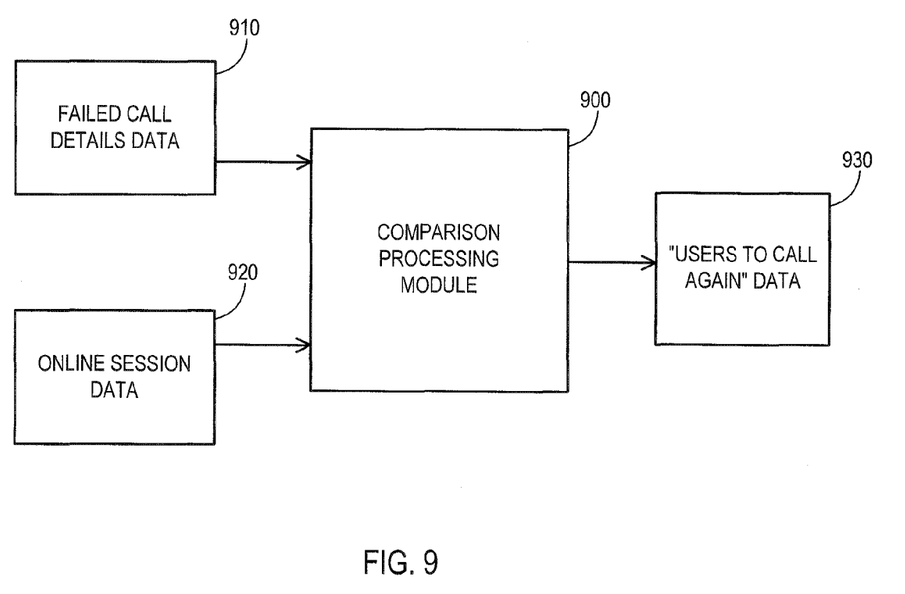
FIG. 9 is a schematic block diagram of the comparison of call details data and online session details data according to an embodiment of the invention.

FIG. 9 is a schematic block diagram of exemplary processing that a preferred caller 870 may perform to identify users 805 to call. Failed call details data 910 and online session data 920 are input into comparison processing module 900. The processing performed by comparison processing module 900 results in "users to call again" data 930.

Comparison processing module 900 processes the data to identify which users to call. For example, the online session data 920 can be compared to failed call details data 910 to identify users who should be called again. In particular, the phone numbers in the failed call details data 910 can be compared to phone numbers in the online session data 920. Addresses, names or other identification data could be used as the basis of comparison. Alternatively, the online session data 920 can simply be processed (without comparison to failed calls data 910) to identify users that have just completed an online session within some time interval. The time interval since the end of an online session may be compared to a threshold, such as within sixty minutes, thirty minutes, fifteen minutes, and so forth. An alternative embodiment combines both approaches. Online session data 920 is compared to failed call details data 910 to identify users who were missed previously. Online session data 920 is also processed to check how long it has been since a user completed an online session.

Figure 10:
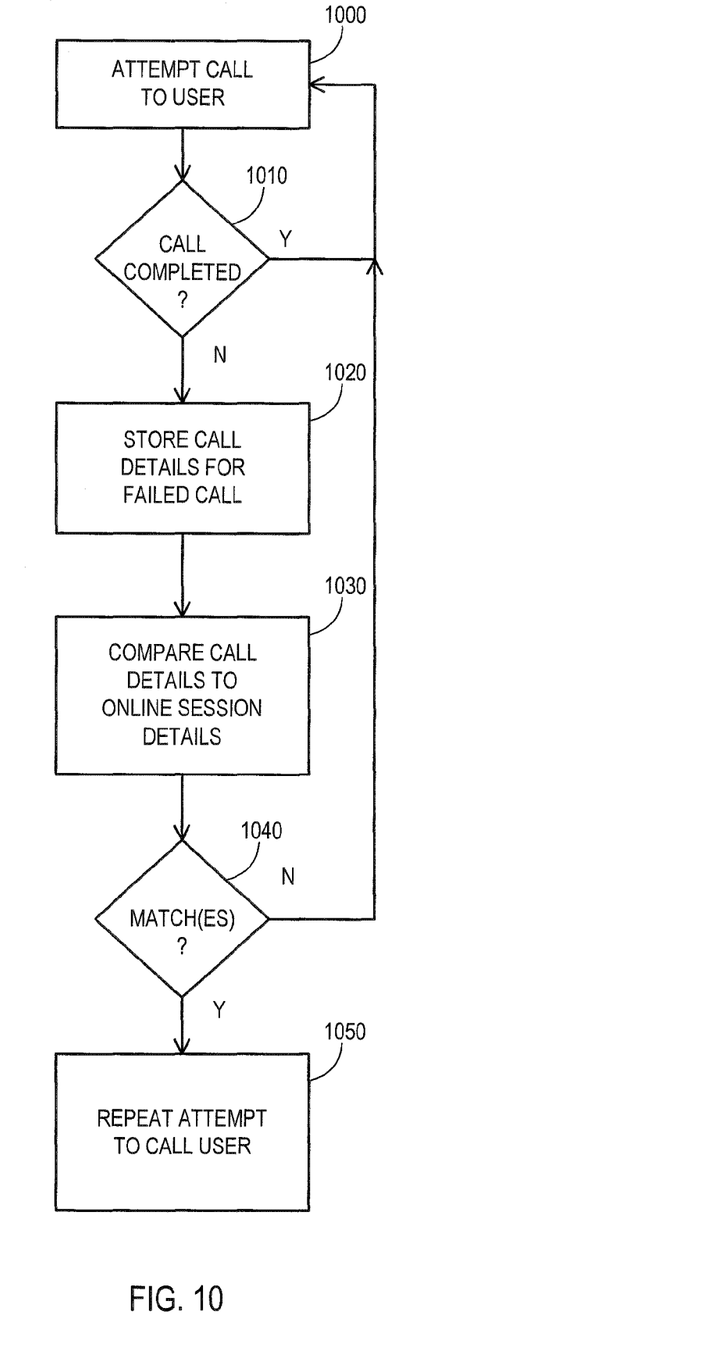
FIG. 10 is an exemplary flow diagram for identifying users to be called again according to an embodiment of the invention.

FIG. 10 is an exemplary flow diagram for identifying users to be called again according to an embodiment of the invention. According to 1000, an attempt is made to call a user. If the call is successfully completed at "Y" of 1010, the next call is attempted as the method returns to 1000.

If the call is not successfully completed at "N" of 1010, call details data is stored for the failed call at 1020. At 1030, call details data is compared to online session data. If there is a match at "Y" of 1040, a repeated attempt to contact the user is made at 1050. According to an embodiment of the invention, the repeat call may be performed by an automated dialing system. If there is no match at "N" of 1040, the next call is attempted. The match at 1040 of FIG. 10 could comprise a matched phone number, address, name, or any other identifying data.

Embodiments of systems and methods for have been described. In the foregoing description, for purposes of explanation, numerous specific details are set forth to provide a thorough understanding of the present invention. It will be appreciated, however, by one skilled in the art that the present invention may be practiced without these specific details. Additionally, in the foregoing detailed description, the present invention has been described with reference to specific exemplary embodiments. These specific embodiments are intended to exemplary only and, accordingly, the present specification and figures are to be regarded as illustrative rather than restrictive.

What is claimed is:

1. A method for contacting a user, comprising:
   electronically receiving online session data that specifies users who have ended recent online sessions;
   processing on a computer processor the online session data to identify users to call who have recently ended their online sessions, wherein the step of processing comprises a determination of the time interval since an online session was completed; and
   calling the users who have recently ended their online sessions.

2. The method of claim 1, wherein the online session data identifies a user that has completed an Internet session.

3. The method of claim 1, wherein the online session data includes a phone number.

4. The method of claim 1, wherein the online session data includes a phone number and an address.

5. The method of claim 1, wherein the online session data indicates the time an Internet session was completed.

6. The method of claim 1, wherein the step of processing comprises:
generating one or more data related to failed calls to users; and
comparing the session data to one or more data related to failed calls to users.

7. The method of claim 6, wherein the failed calls comprise one or more of busy calls and unanswered calls.

8. The method of claim 1, wherein the session data is received, by a telemarketer from Internet Service Provider (ISP).

9. A method for contacting users, comprising:
placing calls to users;
storing call details for calls not successfully completed;
comparing the call details to online session data that specifies users who recently ended an online session, wherein the step of comparing comprises determining the interval since an online session was completed; and
repeating phone calls to users who recently ended an online session and that were previously unsuccessfully called based on the step of comparing.

10. The method of claim 9, wherein the call details include phone numbers.

11. The method of claim 9, wherein the call details include an indication of answered calls or busy calls.

12. The method of claim 9, further comprising the step of receiving the call details from a telephone service provider.

13. The method of claim 12, wherein the telephone service provider stores the call details based on a trigger at a Service Switching Point (SSP).

14. The method of claim 13, wherein the trigger is based on the detection of an unanswered call or the detection of a busy call.

15. The method of claim 9, wherein the online session data is provided by an Internet Service Provider (ISP).

16. The method of claim 9, wherein the online session data includes a phone number and the end time of an online session.

17. The method of claim 9, wherein the step of comparing comprises comparing phone numbers in the call details to phone numbers in the online session data.

18. The method of claim 9, wherein the step of repeating is automated.

19. A system for contacting users, comprising:
means for receiving online session data that specifies users who have ended recent online sessions;
means for processing the online session data to identify users to call who have recently ended their online sessions, wherein the means for processing comprises a computer adapted to determine a time interval since an online session was completed; and
means for calling the users who have recently ended their online sessions.

20. The system of claim 19, wherein the means for receiving online session data comprises means for communicating with an Internet Service Provider (ISP).

21. The system of claim 20, wherein the means for communicating comprises access to e-mail containing the online session data.

22. The system of claim 20, wherein the means for communicating comprises access to a Web site containing the online session data.

23. The system of claim 20, wherein the means for communicating comprises a facsimile connection to a file containing the online session data.

24. The system of claim 20, wherein the means for communicating comprises a direction connection for receiving a file containing the online session data.

25. The system of claim 20, wherein the means for calling comprises a telephone.

26. The system of claim 20, wherein the means for calling comprises a telephone.

27. The system of claim 20, wherein the means for calling comprises automated dialing software.

28. A system for contacting users, comprising:
means for calling to users;
means for storing call details for calls not successfully completed;
means for comparing the call details to online session data that specifies users who recently ended an online session, wherein the means for comparing comprises a computer adapted to compare phone numbers in the call details to phone numbers in the online session data and wherein the computer is further adapted to process the online session data to determine a time interval since an online session ended and wherein the computer is further adapted to compare the time interval to a threshold to determine whether a specific user is targeted for a repeat call; and
means for repeating calls to users who recently ended an online session and that were previously unsuccessfully called.

29. The system of claim 28, wherein the online session data includes a phone number and the time of the end of an online session.

30. The system of claim 28, wherein the call details include whether a call was busy or answered.

* * * * *